(12) United States Patent
Fujimoto et al.

(10) Patent No.: US 11,597,827 B2
(45) Date of Patent: Mar. 7, 2023

(54) RESIN COMPOSITION, PELLET, COMPOSITE MOLDED ARTICLE, METHOD FOR MANUFACTURING COMPOSITE MOLDED ARTICLE AND TANK

(71) Applicants: MITSUBISHI ENGINEERING-PLASTICS CORPORATION, Tokyo (JP); JAPAN POLYETHYLENE CORPORATION, Tokyo (JP)

(72) Inventors: Kunihiko Fujimoto, Hiratsuka (JP); Kei Takahashi, Tokyo (JP); Ritsuya Matsumoto, Kawasaki (JP)

(73) Assignees: MITSUBISHI ENGINEERING-PLASTICS CORPORATION, Tokyo (JP); JAPAN POLYETHYLENE CORPORATION, Tokyo (JP)

(*) Notice: Subject to any disclaimer, the term of this patent is extended or adjusted under 35 U.S.C. 154(b) by 0 days.

(21) Appl. No.: 17/271,503

(22) PCT Filed: Aug. 28, 2019

(86) PCT No.: PCT/JP2019/033622
§ 371 (c)(1),
(2) Date: Feb. 25, 2021

(87) PCT Pub. No.: WO2020/045467
PCT Pub. Date: Mar. 5, 2020

(65) Prior Publication Data
US 2021/0198466 A1 Jul. 1, 2021

(30) Foreign Application Priority Data
Aug. 29, 2018 (JP) .............................. JP2018-160611

(51) Int. Cl.
*C08L 23/26* (2006.01)
*B29C 45/00* (2006.01)
(Continued)

(52) U.S. Cl.
CPC .......... *C08L 23/26* (2013.01); *B29C 45/0001* (2013.01); *B29C 45/14467* (2013.01);
(Continued)

(58) Field of Classification Search
CPC .......... C08L 23/26; C08L 51/06; C08L 59/00
See application file for complete search history.

(56) References Cited

U.S. PATENT DOCUMENTS

| 5,539,030 A * | 7/1996 | Laughner ............... C08L 71/123 525/394 |
| 2015/0183982 A1* | 7/2015 | Yamada ................. B32B 27/42 525/154 |
| 2017/0306141 A1 | 10/2017 | Shimoda | |

FOREIGN PATENT DOCUMENTS

| CN | 1156469 A | 8/1997 |
| CN | 101541884 A | 9/2009 |

(Continued)

OTHER PUBLICATIONS

Extended European Search Report issued in corresponding European Patent Application No. 19855798.5 dated Apr. 26, 2022.
(Continued)

*Primary Examiner* — Mark S Kaucher
(74) *Attorney, Agent, or Firm* — Birch, Stewart, Kolasch & Birch, LLP

(57) ABSTRACT

To provide a resin composition, a pellet, a composite molded article, a method for manufacturing a composite molded article and a tank, all capable of enabling tight joining and integration of the polyacetal resin molded article and the polyethylene resin molded article, and of suppressing form-
(Continued)

aldehyde emission and occurrence of mold deposit. The resin composition contains a resin ingredient and melamine, the resin ingredient containing a polyacetal resin and a maleic anhydride-modified polyethylene resin, the polyacetal resin and the maleic anhydride-modified polyethylene resin following a mass proportion of (20 to 49):(80 to 51), and molar concentration of the maleic anhydride group capable of reacting with amino group of melamine contained in the resin composition being 5 to 25 μmol/g.

20 Claims, 1 Drawing Sheet

(51) Int. Cl.
    *B29C 45/14*     (2006.01)
    *B29C 45/16*     (2006.01)
    *B32B 1/02*     (2006.01)
    *B32B 27/08*     (2006.01)
    *B32B 27/32*     (2006.01)
    *B32B 27/42*     (2006.01)
    *B29K 59/00*     (2006.01)
    *B29L 31/00*     (2006.01)
    *C08L 51/06*     (2006.01)

(52) U.S. Cl.
CPC ............... *B29C 45/16* (2013.01); *B32B 1/02* (2013.01); *B32B 27/08* (2013.01); *B32B 27/32* (2013.01); *B32B 27/42* (2013.01); *B29K 2023/06* (2013.01); *B29K 2059/00* (2013.01); *B29L 2031/7172* (2013.01); *B32B 2250/03* (2013.01); *B32B 2250/24* (2013.01); *B32B 2307/714* (2013.01); *B32B 2439/40* (2013.01); *C08L 51/06* (2013.01)

(56) References Cited

FOREIGN PATENT DOCUMENTS

| | | |
|---|---|---|
| CN | 102304208 A | 1/2012 |
| CN | 104508038 A | 4/2015 |
| CN | 106604965 A | 4/2017 |
| EP | 2 881 432 A1 | 6/2015 |
| JP | 7-109401 A | 4/1995 |
| JP | 2002-138185 A | 5/2002 |
| WO | WO 2005/026259 A1 | 3/2005 |
| WO | WO 2016/051881 A1 | 4/2016 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2019/033622, dated Mar. 11, 2021, with English translation of the Written Opinion.

Chinese Office Action and Search Report for corresponding Chinese Application No. 201980056733.8, dated Nov. 14, 2022, with an English translation.

\* cited by examiner

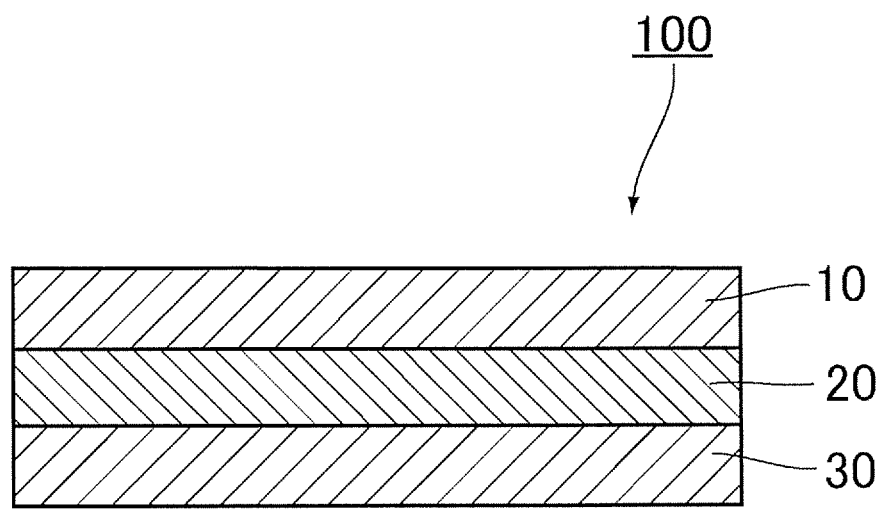

RESIN COMPOSITION, PELLET, COMPOSITE MOLDED ARTICLE, METHOD FOR MANUFACTURING COMPOSITE MOLDED ARTICLE AND TANK

TECHNICAL FIELD

This invention relates to a resin composition, a pellet and a composite molded article, and in particular to a resin composition used for joining a polyacetal resin molded article and a polyethylene resin molded article, a pellet, a composite molded article, a method for manufacturing a composite molded article, and a tank.

BACKGROUND ART

Polyacetal resin, one of engineering plastics, has widely been employed for example in automotive components, electric/electronic equipment components and OA components, for its excellent mechanical characteristics, electrical characteristics, slidability and chemical resistance. Among these applications, those particularly benefited from excellent chemical resistance of the polyacetal resin are exemplified by fuel tank joining components that come in direct contact with gasoline or other fuels, such as flange, valve, tube and so forth to be connected to automotive fuel tank.

On the other hand, polyethylene resin has been increasingly employed as a material for automotive fuel tank, for the purpose of reducing vehicle weight and improving fuel economy.

Now, as a method of attaching fuel tank joining components formed of the polyacetal resin to the fuel tank formed of polyethylene resin, there has been known a method of welding the polyacetal resin and the polyethylene resin. Weldability at the interface between the polyacetal resin and the polyethylene resin is however poor in most cases, so that the weld part could easily separate under external force, causing leakage of volatile fuel through the interface of the resins. In particular, such fuel leakage has been more strictly regulated worldwide, since the fuel with large volatility could invite air pollution. There has therefore been a strong need for a technology that enables joining and integration of a polyacetal resin molded article and a polyethylene resin molded article.

As an example of integration of a polyacetal resin and a different kind of material, Patent Literature 1 describes a structure as below:

a thermoplastic resin joined structure that includes two or more kinds of resin ingredient, having at least one structure in which two adjoining ingredients are (A) ingredient and (B) ingredient below:

(A) ingredient; a resin composition that includes 5 to 80% by mass, relative to the total mass of the (A) ingredient, of a polyacetal resin (referred to as (A-1) ingredient, hereinafter), and 20 to 95% by mass, relative to the total mass of the (A) ingredient, of one or more kinds of resin composition selected from polyolefin resin, olefinic elastomer or hydrogenated butadiene-based elastomer (referred to as (A-2) ingredient, hereinafter); and (B) ingredient; a thermoplastic resin.

CITATION LIST

Patent Literature

[Patent Literature 1] JP-A-2002-138185

SUMMARY OF THE INVENTION

Technical Problem

As a technology for integrating the polyacetal resin molded article and the polyethylene resin molded article, the present inventors focused on a technology of providing an intermediate layer between the two, investigated into a material that composes the intermediate layer, and confirmed that, as such material, a resin composition that contains a polyacetal resin and a maleic anhydride-modified polyethylene resin demonstrates a large effect. It has, however, been becoming clear that the resin composition based on the aforementioned blend cannot fully express the performance depending on the blending ratio of the resin ingredients, can occasionally cause formaldehyde emission, and can occasionally cause mold deposit which means residence of adherent on molding dies.

This invention is aimed to solve the aforementioned problems, and is to provide a resin composition, a pellet, a composite molded article, a method for manufacturing a composite molded article and a tank, all capable of enabling tight joining and integration of the polyacetal resin molded article and the polyethylene resin molded article, and of suppressing formaldehyde emission and occurrence of mold deposit.

Solution to Problem

The present inventors conducted diligent research to address the above-mentioned problems, and as a result, discovered that the above problems are solved by the following means <1>, and preferably by the following means <2> to <16>.

<1> A resin composition comprising a resin ingredient and melamine, the resin ingredient containing a polyacetal resin and a maleic anhydride-modified polyethylene resin, the polyacetal resin and the maleic anhydride-modified polyethylene resin following a mass proportion of 20 to 49:80 to 51, and molar concentration of the maleic anhydride-derived carbonyl group capable of reacting with amino group of melamine contained in the resin composition being 5 to 25 µmol/g; and, the molar concentration of the maleic anhydride-derived carbonyl group, capable of reacting with amino group of melamine contained in the resin composition, representing molar concentration (µmol/g) of maleic anhydride-derived carbonyl group or molar concentration (µmol/g) of melamine-derived amino group, whichever is smaller, or a common value if both molar concentrations agree.

<2> The resin composition of <1>, wherein a content of melamine accounts for 0.005 to 1% by mass in the composition.

<3> The resin composition of <1> or <2>, wherein a ratio of maleic anhydride modification of the maleic anhydride-modified polyethylene resin is 0.10 to 1.0% by mass.

<4> The resin composition of any one of <1> to <3>, wherein the polyacetal resin has a melt flow rate, when measured at 190° C. under 2.16 kg load, of 60 g/10 min or smaller.

<5> The resin composition of any one of <1> to <4>, wherein the maleic anhydride-modified polyethylene resin has a melt flow rate, when measured at 190° C. under 2.16 kg load, of 10 g/10 min or smaller.

<6> The resin composition of any one of <1> to <5>, wherein the maleic anhydride-modified polyethylene resin has a density of 0.954 g/cm$^3$ or smaller.

<7> The resin composition of any one of <1> to <6>, wherein the polyacetal resin and the maleic anhydride-modified polyethylene resin follow a mass proportion of 20 to 40:60 to 80.

<8> A pellet formed of a resin composition described in any one of <1> to <7>.

<9> A composite molded article comprising:
a polyacetal resin molded article that contains a polyacetal resin;
a polyethylene resin molded article that contains a polyethylene resin; and
an intermediate layer arranged between the polyacetal resin molded article and the polyethylene resin molded article, so as to be brought into contact with the polyacetal resin molded article and the polyethylene resin molded article,
and,
the intermediate layer being formed of the resin composition described in any one of <1> to <7>.

<10> A method for manufacturing a composite molded article described in <9>, the method comprising:
stacking the polyacetal resin molded article, the polyethylene resin molded article and the intermediate layer, while placing the intermediate layer between the polyacetal resin molded article and the polyethylene resin molded article.

<11> A method for manufacturing a composite molded article, the method comprising:
forming a polyacetal resin molded article, on one face of an intermediate layer that is formed of a resin composition described in any one of <1> to <7>; and
forming a polyethylene resin molded article, on the other face of the intermediate layer.

<12> The method for manufacturing a composite molded article of <11>,
wherein the step of forming the polyacetal resin molded article includes molding a molten composition that contains a polyacetal resin, in contact with the intermediate layer, and the step of forming the polyethylene resin molded article include molding a molten composition that contains a polyethylene resin, in contact with the intermediate layer.

<13> The method for manufacturing the composite molded article of any one of <10> to <12>,
wherein the polyacetal resin molded article, the intermediate layer and the polyethylene resin molded article are integrally formed by three-color molding or insert molding.

<14> A tank comprising a composite molded article described in <9>.

<15> The tank of <14>, used for storing at least either one of fuel or alcohols.

<16> The tank of <15>, used for storing the fuel that contains gasoline, light oil or biodiesel.

Advantageous Effects of Invention

According to this invention, it now becomes possible to tightly join and integrate the polyacetal resin molded article and the polyethylene resin molded article, and to suppress formaldehyde emission and occurrence of mold deposit.

BRIEF DESCRIPTION OF DRAWING

FIG. 1 is a cross sectional view illustrating an embodiment of a composite molded article of this invention.

DESCRIPTION OF EMBODIMENTS

This invention will be detailed below. Note that all numerical ranges given in this patent specification, using "to" preceded and succeeded by numerals, are used to represent the ranges including these numerals respectively as the lower and upper limit values.

The resin composition of this invention includes a resin ingredient and melamine, and is featured by that the resin ingredient contains a polyacetal resin and a maleic anhydride-modified polyethylene resin, the polyacetal resin and the maleic anhydride-modified polyethylene resin follow a mass proportion of (20 to 49):(80 to 51), and molar concentration of the maleic anhydride-derived carbonyl group capable of reacting with amino group of melamine contained in the resin composition is 5 to 25 μmol/g. By using the thus-configured resin composition as a material for the intermediate layer that is interposed between the polyethylene resin molded article and the polyacetal resin molded article, it now becomes possible to tightly join and integrate the polyacetal resin molded article and the polyethylene resin molded article, and to suppress formaldehyde emission and occurrence of mold deposit.

<Resin Ingredient>

The resin composition of this invention contains, as the resin ingredient, the polyacetal resin and the polyethylene resin modified with maleic anhydride (may occasionally referred to simply as "maleic anhydride-modified polyethylene resin", hereinafter).

Mass proportion of the polyacetal resin and the maleic anhydride-modified polyethylene resin is (20 to 49):(80 to 51), and preferably (20 to 40):(80 to 60). With the amount of maleic anhydride-modified polyethylene resin controlled to the upper limit value or below, adhesiveness between the adjoining polyethylene resin molded article and the polyacetal resin molded article may be improved. By further controlling the amount of polyacetal resin to the aforementioned upper limit value or below, the adhesiveness with the adjoining polyacetal resin molded article may be improved.

In this invention, the resin ingredient may contain only one kind of the polyacetal resin, or may contain two or more kinds. When two or more kinds are contained, the total content preferably falls within the aforementioned ranges. Meanwhile in this invention, the resin ingredient may contain only one kind of the maleic anhydride-modified polyethylene resin, or may contain two or more kinds. When two or more kinds are contained, the total content preferably falls within the aforementioned ranges.

In the resin composition of this invention, total of the polyacetal resin and the maleic anhydride-modified polyethylene resin preferably accounts for 95% by mass or more of the resin ingredient contained in the composition, more preferably accounts for 97% by mass or more, and even may be 99% by mass or more. The resin composition of this invention is preferably such that 90% by mass or more thereof is assignable to the resin ingredient, more preferably 95% by mass or more thereof is assignable to the resin ingredient, and even more preferably 97% by mass or more thereof is assignable to the resin ingredient.

«Polyacetal Resin»

The resin ingredient in this invention contains the polyacetal resin. The polyacetal resin may be a homopolymer that contains divalent oxymethylene group only, or may be a copolymer that contains, as the structural units, divalent oxymethylene group and divalent oxyethylene group, wherein the copolymer that contains, as the structural units, divalent oxymethylene group and divalent oxyethylene group is preferred. The polyacetal resin, when given as the copolymer that contains divalent oxymethylene group and divalent oxyethylene group, as the structural units, excels in heat stability, and therefore also the composite molded article further excels in heat stability.

In a case where the polyacetal resin is a copolymer that contains the divalent oxymethylene group and the divalent oxyethylene group as the structural units, ratio of oxyethylene group (amount of comonomer) in the polyacetal resin, per 100 mol of oxymethylene group is preferably 1.0 mol or more, although not specifically limited. The intermediate layer in this case can demonstrate larger adhesiveness to the polyethylene resin molded article, than in a case where the content of oxyethylene group per 100 mol of oxymethylene group is less than 1.0 mol, and can fully suppress separation between the polyacetal resin molded article and the intermediate layer. Ratio of oxyethylene group per 100 mol of oxymethylene group is more preferably 1.2 mol or larger, and particularly 1.4 mol or larger. Meanwhile, ratio of oxyethylene group per 100 mol of oxymethylene group is preferably 5.5 mol or smaller, more preferably 4.0 mol or smaller, and even may be 3.0 mol or smaller.

The polyacetal resin may be manufactured typically by using trioxane as a major starting material. When introducing oxyethylene group into the polyacetal resin, 1,3-dioxolane dioxolane or ethylene oxide, for example, may only be used as a comonomer.

Melt flow rate (MFR) of the polyacetal resin, measured at 190° C. under 2.16 kg load is preferably 40 g/10 min or smaller, although not specifically limited, more preferably 30 g/10 min or smaller, even more preferably 10 g/10 min or smaller, yet more preferably 5.0 g/10 min or smaller, and particularly 3.0 g/10 min or smaller. The lower limit value of the melt flow rate of the polyacetal resin is preferably 0.02 g/10 min or above, although not specifically limited, and more preferably 1.0 g/10 min or above, and even more preferably 1.3 g/10 min or above.

With the melt flow rate adjusted to the aforementioned upper limit value or below, the polyacetal resin, when used as the intermediate layer, can demonstrate larger adhesiveness to the polyethylene resin molded article and to the polyacetal resin molded article. Referring now to FIG. 1, adhesiveness between a polyacetal resin molded article 10 and an intermediate layer 20 tends to improve more efficiently.

Now, the melt flow rate means value measured by a method in compliance with ISO 1133.

The resin composition of this invention preferably contains 10% by mass or more, relative to the composition, of the polyacetal resin, wherein the ratio is more preferably 20% by mass or more. Meanwhile, the resin composition of this invention preferably contains 49% by mass or less, relative to the composition, of the polyacetal resin, wherein the ratio may be 45% by mass or below, 40% by mass or below, or even may be 35% by mass or below.

«Polyethylene Resin»

For the maleic anhydride-modified polyethylene resin contained in the resin ingredient in this invention, any polyethylene resin modified with maleic anhydride is employable without special limitation. The polyethylene resin employable here to be modified with maleic anhydride includes high-density polyethylene resin, middle-density polyethylene resin, low-density polyethylene resin produced by high-pressure process, straight chain low-density polyethylene resin, ultra-low-density polyethylene resin and so forth. One kind of them may be used independently, or two or more kinds may be used in a combined manner.

The maleic anhydride-modified polyethylene resin is exemplified by a polyethylene resin that contains two kinds of structural unit represented by formula (2) below.

Although the maleic anhydride-modified polyethylene resin in this invention may contain any structural unit other than such two kinds of structural unit represented by formula (2) below, it is preferable that total of such two kinds of structural unit represented by formula (2) below accounts for 90 mol % or more of all structural units that compose the maleic anhydride-modified polyethylene resin.

Formula (2)

[Chemical Formula 1]

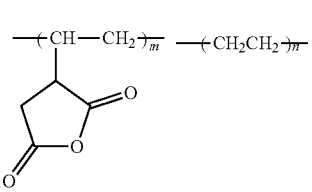

In formula (2), each of m and n independently represents a number larger than 0. Ranges of m and n are exemplified by 0.02 to 5.5 for m, and 830 to 970 for n, although not specifically limited.

Maleic anhydride group in this invention means a maleic anhydride group bound to the polyethylene resin.

Although ratio of maleic anhydride modification in the maleic anhydride-modified polyethylene resin is not specifically limited, it is preferable that the ratio of maleic anhydride modification is not smaller than 0.01% by mass of the polyethylene resin modified with maleic anhydride (maleic anhydride-modified polyethylene resin), the ratio is more preferably 0.05% by mass or larger, and even more preferably 0.10% by mass or larger. Meanwhile, the ratio of maleic anhydride modification of the maleic anhydride-modified polyethylene resin is preferably 1.0% by mass or smaller, more preferably 0.8% by mass or smaller, even more preferably 0.50% by mass or smaller, and yet more preferably 0.30% by mass or smaller. With the ratio of maleic anhydride modification adjusted to the aforementioned lower limit value or above, the intermediate layer will have more excellent adhesiveness to the polyacetal resin molded article, making it possible to more fully suppress separation between the polyacetal resin molded article and the intermediate layer. With the ratio of maleic anhydride modification adjusted to the aforementioned upper limit value or below, it now becomes possible to suppress occurrence of mold deposit and formaldehyde emission, synergistically with an action of melamine described later.

The maleic anhydride-modified polyethylene resin may be manufactured by uniformly mixing the polyethylene resin, maleic anhydride and a radical generator, so as to allow graft modification of the polyethylene resin with maleic anhydride to proceed. Such method is specifically exemplified by melt kneading by use of extruder, Banbury mixer, kneader or the like; solution method dissolving the materials in a proper solvent; slurry method suspending the materials in a proper solvent; and vapor phase grafting. Process temperature may properly be selected while considering degradation of the polyethylene resin, decomposition of acid or acid anhydride, and decomposition temperature of peroxide to be employed. Referring now to melt kneading, the process temperature is typically 190° C. to 350° C., and preferably 200° C. to 300° C. in particular.

When manufacturing the maleic anhydride-modified polyethylene resin, employable is a method of removing unreacted monomers (unsaturated carboxylic acid and derivative thereof) and various by-produced components, by heating, washing or the like.

A radical generator used for the graft modification is exemplified by organic peroxides such as dicumyl peroxide, benzoyl peroxide, di-t-butyl peroxide, 2,5-dimethyl-2,5-di(t-butylperoxy)hexane, 2,5-dimethyl-2,5-di(t-butylperoxy)hexine-3,2,5-dimethyl-2,5-di(t-butylperoxy) hexane, lauroyl peroxide, t-butylperoxy benzoate, 1,1,3,3-tetramethylbutyl hydroperoxide, diisopropylbenzene hydroperoxide, t-butyl-cumyl peroxide, α,α'-bis(t-butylperoxy-m-isopropyl)benzene, di-t-butyldiperoxy isophthalate, n-butyl-4,4-bis(t-butylperoxy) valerate, t-butylperoxy benzoate, t-butyl peroxyacetate, cyclohexanone peroxide, t-butylperoxy laurate and acetyl peroxide. Among them, those demonstrating a half-life of one minute at a decomposition temperature of 160 to 200° C. are preferred. With the decomposition temperature selected to be 160° C. or above, the polyethylene resin as a starting material is suppressed from starting decomposition before being fully plasticized within an extruder, and thereby the reaction rate is further elevated. On the other hand, with the decomposition temperature selected to be 200° C. or below, the reaction will be more likely to complete within the extruder.

The maleic anhydride-modified polyethylene resin preferably has a density of 0.970 g/cm$^3$ or smaller, which is more preferably 0.954 g/cm$^3$ or smaller. When adjusted to 0.970 g/cm$^3$ or smaller, the intermediate layer will become more tightly adhesive to the polyacetal resin molded article. The density of the maleic anhydride-modified polyethylene resin is more preferably 0.940 g/cm$^3$ or smaller. Meanwhile, the maleic anhydride-modified polyethylene resin preferably has a density of 0.912 g/cm$^3$ or larger, which is more preferably 0.925 g/cm$^3$ or larger. Now, the density of the maleic anhydride-modified polyethylene resin means value measured in compliance with JIS K 7112.

The maleic anhydride-modified polyethylene resin preferably has a melt flow rate, measured at 190° C. under 2.16 kg load, of 10 g/10 min or smaller, which is more preferably 2.5 g/10 min or smaller, even more preferably 2.0 g/10 min or smaller, yet more preferably 1.0 g/10 min or smaller, and furthermore preferably 0.7 g/10 min or smaller. Although not specifically limited, the lower limit value of the flow rate of the polyethylene resin is preferably 0 g/10 min or larger, more preferably 0.1 g/10 min or larger, and even more preferably 0.2 g/10 min or larger. In particular, with the melt flow rate of the polyethylene resin, measured at 190° C. under 2.16 kg load, adjusted to the aforementioned upper limit value or below, the obtainable resin composition will have appropriate fluidity as compared with the case where the melt flow rate exceeds the upper limit, and the obtainable intermediate layer will more likely to demonstrate larger adhesiveness to the polyethylene resin molded article and to the polyacetal resin molded article.

In this invention, difference of melt flow rate between the polyacetal resin and the maleic anhydride-modified polyethylene resin contained in the resin ingredient, when measured at 190° C. under 2.16 kg load, is preferably 1.0 g/10 min or larger, and more preferably 1.5 g/10 min or larger. The upper limit value of the difference of the melt flow rates is preferably 3.0 g/10 min or below, and more preferably 2.5 g/10 min or below. With such configuration, the effect of this invention will more efficiently be demonstrated.

The resin composition of this invention preferably contains 30% by mass or more of the maleic anhydride-modified polyethylene resin relative to the composition, the content is more preferably 40% by mass or more, even more preferably 50% by mass or more, yet more preferably 60% by mass, and furthermore preferably 65% by mass or more. Meanwhile, the resin composition preferably contains 97% by mass or less of the maleic anhydride-modified polyethylene resin relative to the composition, the content is more preferably 90% by mass or less, even more preferably 80% by mass or less, and yet may be 75% by mass or less.

The resin composition of this invention preferably has a molar number of maleic anhydride-derived carbonyl group per one gram of the composition, that is, a molar concentration of maleic anhydride-derived carbonyl group, of 5 μmol/g or larger, which is more preferably 10 μmol/g or larger. The upper limit value is preferably 40 μmol/g or below, more preferably 35 μmol/g or below, even more preferably 30 μmol/g or below, yet more preferably 25 μmol/g or below, and furthermore preferably 20 μmol/g or below. With the molar concentration of the maleic anhydride-derived carbonyl group adjusted to the aforementioned lower limit value or above, the obtainable intermediate layer will become more tightly adhesive to the polyethylene resin and to the polyacetal resin. Meanwhile, with the molar concentration adjusted to the aforementioned upper limit value or below, it now becomes possible to suppress occurrence of mold deposit and formaldehyde emission, synergistically with an action of melamine described later.

Note that the resin composition of this invention may contain any polyethylene resin other than the maleic anhydride-modified polyethylene resin. One embodiment of this invention exemplified here is an embodiment in which maleic anhydride-modified polyethylene resin accounts for 90% by mass or more of the polyethylene resin contained in the resin composition of this invention, which may also be 99% by mass or more.

<Melamine>

The resin composition of this invention contains melamine. Although not specifically limited, content of melamine in the resin composition of this invention is preferably 0.005% by mass or more, more preferably 0.01% by mass or more, even more preferably 0.02% by mass or more, and also may be 0.05% by mass or more. The upper limit value is preferably 1% by mass or below, more preferably 0.8% by mass or below, even more preferably 0.5% by mass or below, and even may be 0.3% by mass or below.

Considering now the melamine content in relation to the resin ingredient, 0.005 parts by mass or more of melamine is preferably blended per 100 parts by mass of the resin ingredient, the content is more preferably 0.01 parts by mass or more, even more preferably 0.02 parts by mass or more, and yet more preferably 0.05 parts by mass or more. The upper limit value is preferably 1.0 parts by mass or below, more preferably 0.5 parts by mass or below, and even more preferably 0.3 parts by mass or below.

With the amount of melamine adjusted to the aforementioned lower limit value or above, it now becomes possible to suppress occurrence of mold deposit and formaldehyde emission, while keeping excellent adhesiveness to the adjoining polyethylene resin and to the polyacetal resin, synergistically with the aforementioned action of maleic anhydride in the polyethylene resin. The amount of melamine adjusted to the aforementioned upper limit value or below is particularly beneficial in terms of effectively suppressing formaldehyde emission.

In the resin composition of this invention, melamine allows its amino group to react with the maleic anhydride group bound to the polyethylene resin. If there were too much maleic anhydride group in the system of resin composition, the maleic anhydride group would react with water to open the ring to produce a carboxy group (—COOH), and the carboxy group would damage the polyacetal resin. This would increase emission of formaldehyde, or would worsen the mold deposit. On the other hand, if there were too much melamine-derived amino group, the maleic anhydride-modified polyethylene resin would be crosslinked excessively to increase viscosity of the resin composition, thus reducing the fluidity. Now by employing the molar concentration of effective carbonyl group specified in this invention, the aforementioned individual characteristics may be satisfied concurrently at high levels.

Melamine usually has three amino groups. Any optional substituent may be introduced into the amino groups. That is, the term "melamine" in this invention is used to encompass also such melamine derivatives, so long as the effect of this invention will be demonstrated. From this point of view, the number of amino groups of melamine is given by an integer of 1 to 3, which is preferably 2 or 3, and more preferably 3. With three amino groups, that is, without any substituent, melamine can advantageously demonstrate its intrinsic action. Melamine compounds are exemplified by melamine, melamine cyanurate, acetoguanamine, benzoguanamine, melamine condensates (melam, melem, melon) and methylol melamine. Among them, melamine is exemplified as a preferred compound.

Note that not only the molar concentration of effective carbonyl group, but also amount of addition of melamine, and ratio of maleic anhydride in the polyethylene resin (ratio of modification) would change from the aforementioned values, depending on products, or after prolonged use. Also these cases, of course, fall in the scope or preferred range of this invention, if the specific ranges are satisfied at the time point of blending.

In this invention, pellet formed of the resin composition of this invention is exemplified as an embodiment.

<Other Ingredients>

The resin composition of this invention may contain other ingredient besides the various ingredients described above. Specific examples of such other ingredient include inorganic filler, heat stabilizer, antioxidant, weathering stabilizer, mold releasing agent, lubricant, nucleating agent, antistatic agent, and colorant (pigment, dye). Only one kind of them may be used independently, or two or more kinds may be used in a combined manner.

The pigment is exemplified by carbon black. The carbon black may be incorporated in the resin composition, for example by adding it to a masterbatch, or by directly adding it to the resin composition.

Content of the colorant (for example, carbon black) in the resin composition is preferably 0.05% by mass or more, more preferably 0.1% by mass or more, and even more preferably 0.15% by mass or more. The upper limit value is preferably 1% by mass or below, considering that the effect of this invention will not be reduced.

The resin composition of this invention may also be designed to contain substantially no inorganic filler. The phrase "to contain substantially no . . . " means that the content of the inorganic filler in the resin composition of this invention is less than 1% by mass.

<Resin Composition>

In this invention, the molar concentration of the maleic anhydride-derived carbonyl group, capable of reacting with melamine contained in the resin composition [in this patent specification, the molar concentration (number of maleic anhydride group per unit mass of composition) may be occasionally referred to as "molar concentration of effective carbonyl group" ] is 5 to 25 µmol/g. Now the molar concentration of effective carbonyl group represents molar concentration of maleic anhydride-derived carbonyl group or molar concentration of melamine-derived amino group, whichever is smaller, or a common value if both molar concentrations agree. The molar concentration of maleic anhydride-derived carbonyl group (µmol/g) is given by the number of maleic anhydride-derived carbonyl group per unit mass of the resin composition. The molar concentration of melamine-derived amino group (µmol/g) is given by the number of melamine-derived amino group per unit mass of the resin composition. In this invention, the molar concentration of effective carbonyl group is typically calculated assuming that one equivalence of maleic anhydride (two equivalence of carbonyl group) can react with two equivalence of amino group. The molar concentration of effective carbonyl group is 5 µmol/g or larger, preferably 7 µmol/g or larger, and even may be 10 µmol/g or larger. The upper limit value is 25 µmol/g or below, preferably 20 µmol/g or below, and more preferably 15 µmol/g or below. With the molar concentration of effective carbonyl group adjusted to the aforementioned lower limit value or above, the obtainable intermediate layer can demonstrate excellent adhesiveness to the polyethylene resin and to the polyacetal resin, and can very effectively suppress formaldehyde emission and occurrence of the mold deposit. In particular, in view of very effectively suppressing formaldehyde emission, the molar concentration is preferably adjusted to the aforementioned lower limit value or above. Meanwhile, with the molar concentration adjusted to the aforementioned upper limit value or below, it now becomes possible to prevent the adhesiveness between the polyethylene resin and polyacetal resin from being unexpectedly lowered.

Melt flow rate (MFR) of the resin composition of this invention, measured at 190° C. under and 10 kg load, is preferably 0.3 g/10 min or larger, more preferably 0.5 g/10 min or larger, and may be 1.0 g/10 min or larger. The upper limit value of the melt flow rate is preferably 20.0 g/10 min or below, more preferably 15.0 g/10 min or below, even may be 10.0 g/10 min or below, 5.0 g/10 min or below, and 4.0 g/10 min or below. With the melt flow rate adjusted to the aforementioned lower limit value or above, the resin composition will advantageously have a proper level of moldability during extrusion molding. Meanwhile, with the melt flow rate adjusted to the aforementioned upper limit value or below, again the resin composition will be more easily extruded, and will advantageously have a high level of moldability.

The melt flow rate of the resin composition of this invention is given by measured values obtained in compliance with ISO 1133, unless otherwise specifically noted.

The resin composition of this invention may be used as an adhesive resin composition. The adhesive may typically be such as containing the aforementioned resin composition, and being functionalized to adhere the polyacetal resin molded article that contains the polyacetal resin, with the polyethylene resin molded article that contains the polyethylene resin.

The resin composition of this invention preferably has an adhesion strength, to the polyacetal resin molded article, of 17 N or larger, which is more preferably 20 N or larger. The upper limit value is typically 40 N or below. The adhesion strength to the polyacetal resin molded article follows evaluation of adhesiveness described later in EXAMPLES.

The resin composition of this invention preferably has an adhesion strength, to the polyethylene resin molded article, of 18 N or larger, which is more preferably 20 N or larger.

The upper limit value is typically 40 N or below. The adhesion strength to the polyethylene resin molded article follows evaluation of adhesiveness described later in EXAMPLES.

<Composite Molded Article>

This invention also discloses a composite molded article that includes: a polyacetal resin molded article that contains a polyacetal resin; a polyethylene resin molded article that contains a polyethylene resin; and an intermediate layer arranged between the polyacetal resin molded article and the polyethylene resin molded article, so as to be brought into contact with the polyacetal resin molded article and the polyethylene resin molded article, wherein the intermediate layer is formed of the adhesive resin composition of this invention.

An embodiment of the composite molded article of this invention will be detailed below, referring to FIG. 1. FIG. 1 is a cross sectional view illustrating an embodiment of the composite molded article of this invention As illustrated in FIG. 1, a composite molded article 100 includes a polyacetal resin molded article 10 that contains a polyacetal resin, a polyethylene resin molded article 30 that contains a polyethylene resin, and an intermediate layer 20 arranged between the polyacetal resin molded article 10 and the polyethylene resin molded article 30.

The intermediate layer 20 is formed of the resin composition of this invention.

According to the composite molded article 100, it now becomes possible to fully suppress warping and swelling after brought into contact with a liquid organic compound.

Now an organic compound contained in the liquid organic compound is exemplified by hydrocarbons, alcohols, and mixtures of them.

The hydrocarbons are exemplified by aromatic hydrocarbons such as toluene, and aliphatic hydrocarbons such as isooctane.

The alcohols are exemplified by methanol and ethanol.

More specifically, exemplified is liquid that contains the organic compound such as hydrocarbons including fuel represented by gasoline, light oil and biodiesel; alcohols represented by methanol and ethanol; and mixtures of them.

<Polyacetal Resin Molded Article>

The polyacetal resin contained in the polyacetal resin molded article 10 is not specifically limited so long as it is a polyacetal resin having a divalent oxymethylene group, and may be a homopolymer that contains only divalent oxymethylene group as the structural unit, or may be a copolymer that typically contains divalent oxymethylene group and divalent oxyethylene group as the structural units.

In the polyacetal resin, ratio of oxyethylene group per 100 mol of oxymethylene group may only be 0 to 5 mol for example, without special limitation.

In most cases, the polyacetal resin is manufactured by using trioxane as a major starting material. Oxyethylene group may be introduced into the polyacetal resin, simply by using for example 1,3-dioxolane, ethylene oxide or the like as a comonomer.

The melt flow rate of the polyacetal resin, measured at 190° C. under 2.16 kg load is not specifically limited, and the value thereof may only be 0.1 to 200 g/10 min for example.

The polyacetal resin molded article 10 may only contain the polyacetal resin. The polyacetal resin molded article 10 is formed of a composition that contains the polyacetal resin. The composition that contains the polyacetal resin may be formed of the polyacetal resin only, or may further contain an additive besides the polyacetal resin. Percentage of the polyacetal resin to the polyacetal resin molded article is preferably 70% by mass or larger, and more preferably 80% by mass or larger. The additive is exemplified by inorganic filler, heat stabilizer, antioxidant, weathering stabilizer, mold releasing agent, lubricant, nucleating agent, antistatic agent and pigment. These additives may be used independently, or two or more kinds of them may be used in a combined manner.

In this invention, the polyacetal resin molded article may alternatively be designed to contain substantially no inorganic filler. The phrase "to contain substantially no . . . " means that the content of the inorganic filler in the polyacetal resin molded article is less than 1% by mass.

In this invention, the polyacetal resin contained in the polyacetal resin molded article and the polyacetal resin contained in the adhesive resin composition may be partially or totally commonized, or may be different.

<Polyethylene Resin Molded Article>

The polyethylene resin contained in the polyethylene resin molded article 30 is not specifically limited so long as it is polyethylene resin. Such polyethylene resin employable here includes, for example, high-density polyethylene resin, middle-density polyethylene resin, low-density polyethylene resin produced by high-pressure process, straight chain low-density polyethylene resin and ultra-low-density polyethylene resin. The polyethylene resin contained in the polyethylene resin molded article is preferably not modified with acid, or preferably has an acid modification ratio of smaller than 0.01% by mass of the total mass of polyethylene resin.

The polyethylene resin molded article 30 may only contain the polyethylene resin. The polyethylene resin molded article 30 is formed of a composition that contains the polyethylene resin. The composition that contains the polyethylene resin may be formed of the polyethylene resin only, or may further contain an additive besides the polyethylene resin. Percentage of the polyethylene resin to the polyethylene resin molded article is preferably 70% by mass or larger, and more preferably 80% by mass or larger. The additive is exemplified by inorganic filler, heat stabilizer, antioxidant, weathering stabilizer, mold releasing agent, lubricant, nucleating agent, antistatic agent and pigment. These additives may be used independently, or two or more kinds of them may be used in a combined manner.

In this invention, the polyethylene resin molded article may alternatively be designed to contain substantially no inorganic filler. The phrase "to contain substantially no . . . " means that the content of the inorganic filler is less than 1% by mass of the polyethylene resin molded article.

In this invention, the polyethylene resin contained in the polyethylene resin molded article and the polyethylene resin contained in the adhesive resin composition may be partially or totally commonized, or may be different.

<Method for Manufacturing Composite Molded Article>

This invention also relates to a method for manufacturing the composite molded article, by use of the intermediate layer formed of the resin composition of this invention.

More specifically, this invention discloses a method for manufacturing the composite molded article, the method includes: stacking the polyacetal resin molded article, the polyethylene resin molded article and the intermediate layer, while placing the intermediate layer between the polyacetal resin molded article and the polyethylene resin molded article.

This invention also discloses a method for manufacturing the composite molded article, the method includes: forming a polyacetal resin molded article, on one face of an intermediate layer formed of the resin composition of this invention; and forming a polyethylene resin molded article, on the other face of the intermediate layer. The step of forming the polyacetal resin molded article preferably includes molding a molten composition that contains the polyacetal resin, in contact with the intermediate layer, and the step of forming the polyethylene resin molded article preferably includes molding a molten composition that contains the polyethylene resin, in contact with the intermediate layer. With such structure, adhesiveness among the polyacetal resin molded article and the intermediate layer and the polyethylene resin molded article will tend to improve. The polyacetal resin molded article, the intermediate layer and the polyethylene resin molded article are preferably integrally formed by three-color molding or insert molding.

The method for manufacturing the composite molded article 100 will be detailed below.

The method for manufacturing the composite molded article 100 includes stacking the polyacetal resin molded article 10, the polyethylene resin molded article 30 and the intermediate layer 20, while placing the intermediate layer 20 between the polyacetal resin molded article 10 and the polyethylene resin molded article 30.

More specifically, the composite molded article 100 may be manufactured by a method of independently molding the polyacetal resin molded article 10, the intermediate layer 20 and the polyethylene resin molded article 30, and then stacking and welding them; a method of producing a two-color molded article of the polyacetal resin molded article 10 and the intermediate layer 20 by two-color molding, and then welding the polyethylene resin molded article 30 to the two-color molded article; a method of producing a two-color molded article of the polyethylene resin molded article 30 and the intermediate layer 20 by two-color molding, and then welding the polyacetal resin molded article 10 to the two-color molded article; a method of producing the polyacetal resin molded article 10, intermediate layer 20 and polyethylene resin molded article 30 by three-color molding (three-color continuous molding); or, a method called insert two-color molding that includes preparing the polyethylene resin molded article 30, inserting the polyethylene resin molded article 30 into a die cavity, and then forming the intermediate layer 20 and the polyacetal resin molded article 10 on the polyethylene resin molded article 30 by two-color molding. Among them, particularly preferred is a method of forming the composite molded article 100 based on the three-color continuous molding of the polyacetal resin molded article 10, the intermediate layer 20 and the polyethylene resin molded article 30, from the viewpoint of productivity.

Now, an exemplary method of manufacturing the composite molded article 100, based on the three-color continuous molding of the polyacetal resin molded article 10, the intermediate layer 20 and the polyethylene resin molded article 30 will be explained.

First, three common dies with an identical shape are arranged on a turntable. On the other hand, a primary die, a secondary die and a tertiary die, differing in shape from each other, are prepared. The primary die is used, together with the common die, to manufacture the polyacetal resin molded article 10; and the secondary dis is used, together with the common die and the polyacetal resin molded article 10, to manufacture the intermediate layer 20. The tertiary die is used, together with the common die and the polyacetal resin molded article 10 and the intermediate layer 20, to manufacture the polyethylene resin molded article 30.

First, the polyacetal resin molded article 10 is manufactured by using one common die and the primary die. Next, the turntable is turned, a material for forming the intermediate layer is introduced under heating into a space formed by the polyacetal resin molded article 10, the common die and the secondary die, followed by cooling.

The intermediate layer 20 is thus formed on the polyacetal resin molded article 10, thereby yielding a structural body is obtained.

Next, the turntable is turned, a material for forming the polyethylene resin molded article 30 is introduced under heating into a space formed by the polyacetal resin molded article 10, the common die, the secondary die and the tertiary die, followed by cooling. The polyethylene resin molded article 30 is thus formed on the intermediate layer 20 of the structural body.

The composite molded article 100 is obtained in this way.

Alternatively, from the viewpoint of suppressing interlayer separation in the composite molded article 100, preferred is insert two-color molding among from the aforementioned methods for manufacturing the composite molded article 100, in which the polyethylene resin molded article 30 is prepared, the polyethylene resin molded article 30 is inserted into a die cavity, and then the intermediate layer 20 and the polyacetal resin molded article 10 are sequentially formed on the polyethylene resin molded article 30 by two-color molding. Now this manufacturing method will be detailed below.

In this manufacturing method, first the polyethylene resin molded article 30 is prepared. Meanwhile, two common dies with an identical shape are arranged on the turntable. On the other hand, a die for molding the intermediate layer, and a die for molding the polyacetal resin molded article, differing in shape from each other, are prepared.

Next, the polyethylene resin molded article 30 is inserted into a die cavity formed by one common die and the die for molding the intermediate layer. Next, a material for forming the intermediate layer is introduced under heating into the die cavity, followed by cooling. The intermediate layer 20 is thus formed on the polyethylene resin molded article 30, thereby yielding a structural body.

Next, the turntable is turned, a material for forming the polyacetal resin molded article is introduced under heating into a die cavity formed by another common die and the die for molding the polyacetal resin molded article, followed by cooling. The polyacetal resin molded article 10 is thus formed on the intermediate layer 20 of the structural body.

The composite molded article of this invention is applicable to components to be connected to fuel tank, such as valve device, recirculation line, vent line, flange for fuel sender module, and, prewhirl tank attached to the inner wall of a fuel tank.

One embodiment of the composite molded article of this invention relates to a fuel tank. That is, the composite molded article of this invention is used for storing fuels or alcohols. For details of the fuel tank, JP-A-2019-105253, JP-B1-6505289 and JP-B1-6350781 may be referred to, the contents of which are incorporated by reference into this patent specification.

EXAMPLES

This invention will be more specifically explained referring to Examples. All materials, amounts of consumption, ratios, process details, procedures and so forth explained below in EXAMPLES may properly be modified, without departing from the spirit of this invention. Hence, the scope of this invention is not limited by specific examples described below.

<Polyacetal Resin (POM)>

POM-1: acetal copolymer, containing 1.6 mol of oxyethylene group per 100 mol of oxymethylene group, with a melt flow rate (ISO 1133 standard: 190° C., 2.16 kg) of 2.5 g/10 min POM-2: acetal copolymer, containing 1.6 mol of oxyethylene group per 100 mol of oxymethylene group, with a melt flow rate (ISO 1133 standard: 190° C., 2.16 kg) of 9.0 g/10 min POM-3: acetal copolymer, containing 1.6 mol of oxyethylene group per 100 mol of oxymethylene group, with a melt flow rate (ISO 1133 standard: 190° C., 2.16 kg) of 27 g/10 min <Polyethylene Resin (PE)>

PE-1: maleic anhydride-modified polyethylene resin with a density of 0.933 g/cm$^3$ (JIS K7112 compliant), a melt flow rate (ASTM-D1238 standard: 190° C., 2.16 kg) of 0.5 g/10 min, and a ratio of maleic anhydride modification of 0.21% by mass PE-2: maleic anhydride-modified polyethylene resin with a density of 0.933 g/cm$^3$ (JIS K7112 compliant), a melt flow rate (ASTM-D1238 standard: 190° C., 2.16 kg) of 0.5 g/10 min, and a ratio of maleic anhydride modification of 0.11% by mass PE-3: maleic anhydride-modified polyethylene resin with a density of 0.933 g/cm$^3$ (JIS K7112 compliant), a melt flow rate (ASTM-D1238 standard: 190° C., 2.16 kg) of 0.5 g/10 min, and a ratio of maleic anhydride modification of 0.05% by mass PE-4: maleic anhydride-modified polyethylene resin with a density of 0.933 g/cm$^3$ (JIS K7112 compliant), a melt flow rate (ASTM-D1238 standard: 190° C., 2.16 kg) of 1.8 g/10 min, and a ratio of maleic anhydride modification of 0.21% by mass PE-5: maleic anhydride-modified polyethylene resin with a density of 0.933 g/cm$^3$ (JIS K7112 compliant), a melt flow rate (ASTM-D1238 standard: 190° C., 2.16 kg) of 9.7 g/10 min, and a ratio of maleic anhydride modification of 0.21% by mass PE-6: maleic anhydride-modified polyethylene resin with a density of 0.922 g/cm$^3$ (JIS K7112 compliant), a melt flow rate (ASTM-D1238 standard: 190° C., 2.16 kg) of 0.5 g/10 min, and a ratio of maleic anhydride modification of 0.21% by mass Ratio of maleic anhydride modification was measured by a method such as heat-pressing the maleic anhydride-modified polyethylene resin at 180° C. to produce a 100 μm thick film, and then subjecting the film to infrared absorption spectrometry. More specifically, ratio of absorbance of a peak at 1790 cm-1 and absorbance of a peak at 4250 cm-1 in an infrared absorption spectrum was found, and the ratio of maleic anhydride modification was determined from a preliminarily obtained standard curve that correlates ratio of absorbance of infrared spectrum, with 1H-NMR measured value representing ratio of maleic anhydride modification. The number of maleic anhydride-derived carbonyl group in the composition was calculated from the ratio of maleic anhydride modification.

<Carbon Black Masterbatch>

Polyacetal-based masterbatch was obtained by adding 10% by mass of carbon black (manufacturer: Orion Engineered Carbons LLC, product code: Printex P) to a polyacetal copolymer (manufacturer: Mitsubishi Engineering-Plastics Corporation, product code: F30-03) with MFR=27.

Polyethylene-based masterbatch was obtained by adding 25% by mass of carbon black (manufacturer: Orion Engineered Carbons LLC, product code: Printex P) to PE (manufacturer: Japan Polyethylene Corporation, product code: Z50MG) with MFR=9 and a density of 0.925 g/cm$^3$.

<Melamine>

Melamine: compound below

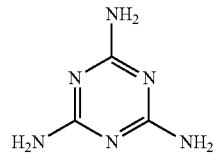

[Chemical Formula 2]

Benzoguanamine: from Nippon Shokubai Co., Ltd.

Examples 1 to 18 and Comparative Examples 1 to 7

Polyacetal resin (POM), polyethylene resin (PE), melamine listed in Table, and, carbon black optionally prepared in the form of masterbatch were mixed according to amounts of blending summarized in Tables 1 to 3, by using Super Mixer from Kawata MFG. Co., Ltd., to obtain each mixture. The mixture was then melt kneaded in a twin screw extruder ("PCM-30" from Ikegai Corporation, screw diameter=30 mm) at 210° C., and extruded. Strands ejected out from the extruder were cooled in a water bath, and cut by using a pelletizer, to obtain pellets for each of Examples 1 to 18 and Comparative Examples 1 to 7.

«Evaluation of Adhesiveness (Adhesion Strength)»

1) Test of Adhesiveness of Intermediate Layer to Polyacetal Resin Molded Article Stacked article A was obtained by using an injection molding machine (DCE-140, from Nissei Plastic Industrial Co., Ltd.). More specifically, first the pellets as a starting material for molding the intermediate layer used in Examples 1 to 18 and Comparative Examples 1 to 7 were injection molded at a resin temperature of 230° C. and a die temperature of 100° C., to form a 123 mm×13 mm×0.8 mm (thick) test film (intermediate layer). Then the die was turned, a part (stacking part) of the polyacetal resin molded article was stacked on the test film, and the residual part (bending part) was bent 90° away from the stacking part, into an L-form. The stacking part measured 63 mm×13 mm×2.0 mm (thick), and the bending part measured 15 mm×13 mm×2.0 mm (thick). The stacking part and the test film were stacked while aligning the longitudinal directions.

The thus obtained stacked article A was set on a tensile tester (Model "5544" from Instron) so as to fix the bending part of the polyacetal resin molded article to the upper jig (stationary side), and to fix the test film (intermediate layer) to the lower jig (moving side). Next, the upper jig was moved upward at a speed of 200 mm/min, so as to peel the polyacetal resin molded article off from the test film of the stacked article A. Maximum tensile force detected by a load cell of the tensile tester was defined to be adhesion strength of the test film (intermediate layer) to the polyacetal resin molded article. The value was given in N.

(2) Test of Adhesiveness of Intermediate Layer to Polyethylene Resin Molded Article On the other hand, stacked article B was obtained by using an injection molding machine (DCE-140, from Nissei Plastic Industrial Co., Ltd.). More specifically, first the pellets as a starting material for forming the polyethylene resin molded article used in Examples 1 to 18 and Comparative Examples 1 to 7 were injection molded at a resin temperature of 200° C. and a die temperature of 100° C., to form a 123 mm×13 mm×0.8 mm (thick) test film (polyethylene resin molded article). Then the die was turned, a part (stacking part) of the intermediate layer was stacked on the test film, and the residual part (bending part) was bent 90° away from the stacking part, into an L-form. The stacking part measured 63 mm×13 mm×2.0 mm (thick), and the bending part measured 15 mm×13 mm×2.0 mm (thick). The stacking part and the test film were stacked while aligning the longitudinal directions.

The thus obtained stacked article B was set on a tensile tester (Model "5544" from Instron) so as to fix the bending part of the intermediate layer to the upper jig (stationary side), and to fix the test film (polyethylene resin molded article) to the lower jig (moving side). Next, the upper jig was moved upward at a speed of 200 mm/min, so as to peel the intermediate layer off from the test film of the stacked article B. Maximum tensile force detected by the load cell of the tensile tester was defined to be adhesion strength of the test film (polyethylene resin molded article) to the intermediate layer. The value was given in N.

«Mold Deposit (MD)»

By use of Minimat M8/7A molding machine from Sumitomo Heavy Industries, Ltd., and a droplet-shaped die as illustrated in FIG. 1 of JP-A-2012-233129, each resin composition was subjected to 1,000-shot continuous molding at a cylinder temperature of 220° C. and a die temperature of 40° C. After completion of the continuous molding, residence of adherent on the die surface was visually observed, and evaluated on a four-grade scale of A to D. Grade B and above represent practically acceptable levels.

A: Extremely small die pollution, almost without die adherent;
B: small die pollution, although with some die adherent;
C: heavy die pollution, with much die adherent; and
D: extremely heavy die pollution, with adherent over entire die.

«Amount of Formaldehyde Emission»

The thus obtained pellets were dried in a hot air dryer at 80° C. for 4 hours, and then made into a 100 mm×40 mm×2 mm flat test specimen, by using an injection molding machine PS-40 from Nissei Plastic Industrial Co., Ltd., at a cylinder temperature of 215° C. and a die temperature of 80° C. On the next day following the molding, the obtained flat test specimen was measured regarding the amount of formaldehyde emission (amount of HCHO emission) according to a method described below, in compliance with Verband der Automobilindustrie Standard VDA 275 (quantification of formaldehyde emission from components of automotive interior, on the basis of modified flask method).

More specifically, 50 mL of distilled water was placed in a polyethylene container, the test specimen was hung in the space, the container was capped, the test specimen was allowed to stand airtight under heating at 60° C. for 3 hours, then allowed to cool at room temperature for 60 minutes, the test specimen was taken out, and the amount formaldehyde absorbed in the distilled water in the polyethylene container was measured by acetyl acetone colorimetry by using a ultraviolet (UV) spectrometer.

Note that the amount of formaldehyde emission in each of individual Examples and Comparative Examples was expressed as a ratio (mass proportion), relative to the amount of formaldehyde emission in Comparative Example 1 assumed to be 100.

«Melt Flow Rate (MFR)»

MFR was measured in compliance with ISO 1133, under conditions of 190° C. and 2.16 kg load. Note however that the melt flow rate of the prepared resin compositions was measured under conditions of 190° C. and 10 kg load.

TABLE 1

| Chemical composition | Item | | Example 1 | Example 2 | Example 3 | Example 4 | Example 5 |
|---|---|---|---|---|---|---|---|
| Polyacetal resin (POM) | Type | | POM-1 | POM-1 | POM-1 | POM-1 | POM-1 |
| | Mass proportion in resin ingredient | % by mass | 30 | 30 | 30 | 30 | 30 |
| | Melt flow rate (MFR) 190° C., 2.16 kg | g/10 min | 2.5 | 2.5 | 2.5 | 2.5 | 2.5 |
| | Amount of comonomer*[1] | % | 1.6 | 1.6 | 1.6 | 1.6 | 1.6 |
| Polyethylene resin (PE) | Type | | PE-1 | PE-1 | PE-1 | PE-2 | PE-2 |
| | Mass proportion in resin ingredient | % by mass | 70 | 70 | 70 | 70 | 70 |
| | Ratio of maleic anhydride modification | % | 0.21 | 0.21 | 0.21 | 0.11 | 0.11 |
| | Molar concentration of maleic anhydride-derived carbonyl group in composition | µmol/g | 30.0 | 30.0 | 30.0 | 15.7 | 15.7 |
| | Melt flow rate (MFR) 190° C., 2.16 kg | g/10 min | 0.5 | 0.5 | 0.5 | 0.5 | 0.5 |
| | Density | g/cm³ | 0.933 | 0.933 | 0.933 | 0.933 | 0.933 |
| Melamine | Type | | Melamine | Melamine | Melamine | Melamine | Melamine |
| | Mass proportion in composition | % by mass | 0.03 | 0.05 | 0.1 | 0.03 | 0.5 |
| | Molecular weight | g | 126.12 | 126.12 | 126.12 | 126.12 | 126.12 |
| | Number of functional groups per molecule | groups/mol | 3 | 3 | 3 | 3 | 3 |
| | Molar concentration of melamine-derived amino group in composition | µmol/g | 7.1 | 11.9 | 23.8 | 7.1 | 118.9 |
| Carbon black | Method of addition | | | | | | |
| | Proportion in composition | % by mass | | | | | |
| Evaluation | Molar concentration of effective carbonyl group*[2] | µmol/g | 7.1 | 11.9 | 23.8 | 7.1 | 15.7 |

TABLE 1-continued

|  |  |  |  |  |  |  |  |
|---|---|---|---|---|---|---|---|
|  | Adhesion strength to POM | N | 31 | 31 | 29 | 33 | 31 |
|  | Adhesion strength to PE | N | 28 | 27 | 25 | 29 | 27 |
|  | Mold deposit (MD) | — | A | A | A | A | A |
|  | Amount of formaldehyde emission*[3] | — | 12 | 10 | 7 | 5 | 3 |
|  | Melt flow rate (MFR) 190° C., 10 kg | g/10 min | 2.5 | 2.1 | 1.1 | 2.8 | 1.9 |

| Chemical composition | Item |  | Example 6 | Example 7 | Example 8 | Example 9 |
|---|---|---|---|---|---|---|
| Polyacetal resin (POM) | Type |  | POM-1 | POM-1 | POM-1 | POM-2 |
|  | Mass proportion in resin ingredient | % by mass | 30 | 30 | 45 | 30 |
|  | Melt flow rate (MFR) 190° C., 2.16 kg | g/10 min | 2.5 | 2.5 | 2.5 | 9 |
|  | Amount of comonomer*[1] | % | 1.6 | 1.6 | 1.6 | 1.6 |
| Polyethylene resin (PE) | Type |  | PE-2 | PE-3 | PE-1 | PE-1 |
|  | Mass proportion in resin ingredient | % by mass | 70 | 70 | 55 | 70 |
|  | Ratio of maleic anhydride modification | % | 0.11 | 0.05 | 0.21 | 0.21 |
|  | Molar concentration of maleic anhydride-derived carbonyl group in composition | μmol/g | 15.7 | 7.1 | 23.6 | 30.0 |
|  | Melt flow rate (MFR) 190° C., 2.16 kg | g/10 min | 0.5 | 0.5 | 0.5 | 0.5 |
|  | Density | g/cm³ | 0.933 | 0.933 | 0.933 | 0.933 |
| Melamine | Type |  | Melamine | Melamine | Melamine | Melamine |
|  | Mass proportion in composition | % by mass | 0.03 | 0.5 | 0.1 | 0.1 |
|  | Molecular weight | g | 126.12 | 126.12 | 126.12 | 126.12 |
|  | Number of functional groups per molecule | groups/mol | 3 | 3 | 3 | 3 |
|  | Molar concentration of melamine-derived amino group in composition | μmol/g | 7.1 | 118.9 | 23.8 | 23.8 |
| Carbon black | Method of addition |  |  |  |  |  |
|  | Proportion in composition | % by mass |  |  |  |  |
| Evaluation | Molar concentration of effective carbonyl group*[2] | μmol/g | 7.1 | 7.1 | 23.6 | 23.8 |
|  | Adhesion strength to POM | N | 33 | 32 | 28 | 26 |
|  | Adhesion strength to PE | N | 28 | 28 | 23 | 23 |
|  | Mold deposit (MD) | — | A | A | A | A |
|  | Amount of formaldehyde emission*[3] | — | 4 | 2 | 5 | 5 |
|  | Melt flow rate (MFR) 190° C., 10 kg | g/10 min | 2.9 | 2.2 | 1.9 | 3.3 |

TABLE 2

| Chemical composition | Item |  | Example 10 | Example 11 | Example 12 | Example 13 |
|---|---|---|---|---|---|---|
| Polyacetal resin (POM) | Type |  | POM-3 | POM-1 | POM-1 | POM-1 |
|  | Mass proportion in resin ingredient | % by mass | 30 | 30 | 30 | 30 |
|  | Melt flow rate (MFR) 190° C., 2.16 kg | g/10 min | 27 | 2.5 | 2.5 | 2.5 |
|  | Amount of comonomer*[1] | % | 1.6 | 1.6 | 1.6 | 1.6 |
| Polyethylene resin (PE) | Type |  | PE-1 | PE-4 | PE-5 | PE-6 |
|  | Mass proportion in resin ingredient | % by mass | 70 | 70 | 70 | 70 |
|  | Ratio of maleic anhydride modification | % | 0.21 | 0.21 | 0.21 | 0.21 |
|  | Molar concentration of maleic anhydride-derived carbonyl group in composition | μmol/g | 30.0 | 30.0 | 30.0 | 30.0 |
|  | Melt flow rate (MFR) 190° C., 2.16 kg | g/10 min | 0.5 | 0.5 | 0.5 | 1.8 |
|  | Density | g/cm³ | 0.933 | 0.922 | 0.954 | 0.933 |

TABLE 2-continued

| | Item | | | | | |
|---|---|---|---|---|---|---|
| Melamine | Type | | Melamine | Melamine | Melamine | Melamine |
| | Mass proportion in composition | % by mass | 0.1 | 0.1 | 0.1 | 0.1 |
| | Molecular weight | g | 126.12 | 126.12 | 126.12 | 126.12 |
| | Number of functional groups per molecule | groups/mol | 3 | 3 | 3 | 3 |
| | Molar concentration of melamine-derived amino group in composition | μmol/g | 23.8 | 23.8 | 23.8 | 23.8 |
| Carbon black | Method of addition | | | | | |
| | Proportion in composition | % by mass | | | | |
| Evaluation | Molar concentration of effective carbonyl group[*2] | μmol/g | 23.8 | 23.8 | 23.8 | 23.8 |
| | Adhesion strength to POM | N | 22 | 32 | 28 | 29 |
| | Adhesion strength to PE | N | 21 | 25 | 29 | 25 |
| | Mold deposit (MD) | — | — | A | A | A | A |
| | Amount of formaldehyde emission[*3] | — | — | 5 | 5 | 5 | 5 |
| | Melt flow rate (MFR) 190° C., 10 kg | g/10 min | 12.8 | 1.2 | 1.2 | 1.9 |

| Chemical composition | Item | | Example 14 | Example 15 | Example 16 | Example 17 |
|---|---|---|---|---|---|---|
| Polyacetal resin (POM) | Type | | POM-1 | POM-1 | POM-1 | POM-1 |
| | Mass proportion in resin ingredient | % by mass | 30 | 30 | 30 | 30 |
| | Melt flow rate (MFR) 190° C., 2.16 kg | g/10 min | 2.5 | 2.5 | 2.5 | 2.5 |
| | Amount of comonomer[*1] | % | 1.6 | 1.6 | 1.6 | 1.6 |
| Polyethylene resin (PE) | Type | | PE-2 | PE-2 | PE-2 | PE-1 |
| | Mass proportion in resin ingredient | % by mass | 70 | 70 | 70 | 70 |
| | Ratio of maleic anhydride modification | % | 0.11 | 0.11 | 0.11 | 0.11 |
| | Molar concentration of maleic anhydride-derived carbonyl group in composition | μmol/g | 15.7 | 15.7 | 15.7 | 15.7 |
| | Melt flow rate (MFR) 190° C., 2.16 kg | g/10 min | 0.5 | 0.5 | 0.5 | 0.5 |
| | Density | g/cm³ | 0.933 | 0.933 | 0.933 | 0.933 |
| Melamine | Type | | Melamine | Melamine | Melamine | Melamine |
| | Mass proportion in composition | % by mass | 0.05 | 0.05 | 0.05 | 1.20 |
| | Molecular weight | g | 126.12 | 126.12 | 126.12 | 126.12 |
| | Number of functional groups per molecule | groups/mol | 3 | 3 | 3 | 3 |
| | Molar concentration of melamine-derived amino group in composition | μmol/g | 11.9 | 11.9 | 11.9 | 285.4 |
| Carbon black | Method of addition | | POM-based masterbatch .2% | PE-based masterbatch, 0.8% | Direct addition | |
| | Proportion in composition | % by mass | 0.2 | 0.20 | 0.2 | |
| Evaluation | Molar concentration of effective carbonyl group[*2] | μmol/g | 11.9 | 11.9 | 11.9 | 15.7 |
| | Adhesion strength to POM | N | 31 | 31 | 31 | 22 |
| | Adhesion strength to PE | N | 27 | 27 | 27 | 21 |
| | Mold deposit (MD) | — | A | A | A | B |
| | Amount of formaldehyde emission[*3] | — | 13 | 12 | 12 | 3 |
| | Melt flow rate (MFR) 190° C., 10 kg | g/10 min | 2.3 | 2.2 | 2.2 | 1.0 |

TABLE 3

| Chemical composition | Item | | Example 18 | Comparative Example 1 | Comparative Example 2 | Comparative Example 3 |
|---|---|---|---|---|---|---|
| Polyacetal resin (POM) | Type | | POM-1 | POM-1 | POM-1 | POM-1 |
| | Mass proportion in resin ingredient | % by mass | 30 | 30 | 30 | 30 |
| | Melt flow rate (MFR) 190° C., 2.16 kg | g/10 min | 2.5 | 2.5 | 2.5 | 2.5 |
| | Amount of comonomer[*1] | % | 1.6 | 1.6 | 1.6 | 1.6 |

TABLE 3-continued

| | | | | | | |
|---|---|---|---|---|---|---|
| Polyethylene resin (PE) | Type | | PE-1 | PE-1 | PE-1 | PE-1 |
| | Mass proportion in resin ingredient | % by mass | 70 | 70 | 70 | 70 |
| | Ratio of maleic anhydride modification | % | 0.21 | 0.21 | 0.21 | 0.21 |
| | Molar concentration of maleic anhydride-derived carbonyl group in composition | μmol/g | 30.0 | 30.0 | 30.0 | 30.0 |
| | Melt flow rate (MFR) 190° C., 2.16 kg | g/10 min | 0.5 | 0.5 | 0.5 | 0.5 |
| | Density | g/cm³ | 0.933 | 0.933 | 0.933 | 0.933 |
| Melamine | Type | | Benzo-quanamine | | Melamine | Melamine |
| | Mass proportion in composition | % by mass | 0.20 | | 0.01 | 0.5 |
| | Molecular weight | g | 187.17 | | 126.12 | 126.12 |
| | Number of functional groups per molecule | groups/mol | 2 | | 3 | 3 |
| | Molar concentration of melamine-derived amino group in composition | μmol/g | 21.4 | | 2.4 | 118.9 |
| Carbon black | Method of addition | | | | | |
| | Proportion in composition | % by mass | | | | |
| Evaluation | Molar concentration of effective carbonyl group*² | μmol/g | 21.4 | | 2.4 | 30.0 |
| | Adhesion strength to POM | N | 33 | 26 | 25 | 25 |
| | Adhesion strength to PE | N | 31 | 25 | 24 | 20 |
| | Mold deposit (MD) | — | B | D | C | A |
| | Amount of formaldehyde emission*³ | — | 50 | 100 | 80 | 3 |
| | Melt flow rate (MFR) 190° C., 10 kg | g/10 min | 1.0 | 3.0 | 2.8 | 0.3 |

| Chemical composition | Item | | Comparative Example 4 | Comparative Example 5 | Comparative Example 6 | Comparative Example 7 |
|---|---|---|---|---|---|---|
| Polyacetal resin (POM) | Type | | POM-1 | POM-1 | POM-1 | POM-1 |
| | Mass proportion in resin ingredient | % by mass | 30 | 70 | 15 | 30 |
| | Melt flow rate (MFR) 190° C., 2.16 kg | g/10 min | 2.5 | 2.5 | 2.5 | 2.5 |
| | Amount of comonomer*¹ | % | 1.6 | 1.6 | 1.6 | 1.6 |
| Polyethylene resin (PE) | Type | | PE-1 | PE-1 | PE-1 | PE-1 |
| | Mass proportion in resin ingredient | % by mass | 70 | 30 | 85 | 70 |
| | Ratio of maleic anhydride modification | % | 0.32 | 0.21 | 0.21 | 0 |
| | Molar concentration of maleic anhydride-derived carbonyl group in composition | umol/g | 45.7 | 12.9 | 36.4 | 0.0 |
| | Melt flow rate (MFR) 190° C., 2.16 kg | g/10 min | 0.5 | 0.5 | 0.5 | 0.5 |
| | Density | g/cm³ | 0.933 | 0.933 | 0.933 | 0.933 |
| Melamine | Type | | Melamine | Melamine | Melamine | Melamine |
| | Mass proportion in composition | % by mass | 1.0 | 0.1 | 0.03 | 0.03 |
| | Molecular weight | g | 126.12 | 126.12 | 126.12 | 126.12 |
| | Number of functional groups per molecule | groups/mol | 3 | 3 | 3 | 3 |
| | Molar concentration of melamine-derived amino group in composition | μmol/g | 237.9 | 23.8 | 7.1 | 7.1 |
| Carbon black | Method of addition | | | | | |
| | Proportion in composition | % by mass | | | | |
| Evaluation | Molar concentration of effective carbonyl group*² | μmol/g | 45.7 | 12.9 | 7.1 | 0.0 |
| | Adhesion strength to POM | N | 20 | 13 | 8 | 11 |
| | Adhesion strength to PE | N | 15 | 12 | 90 | 45 |
| | Mold deposit (MD) | — | A | A | A | A |
| | Amount of formaldehyde emission*³ | — | 2 | 12 | 8 | 12 |
| | Melt flow rate (MFR) 190° C., 10 kg | g/10 min | 0.2 | 3.1 | 2.2 | 2.5 |

As is clear from the results, the resin compositions of this invention were found to demonstrate high adhesiveness to the polyacetal resin molded article and to the polyethylene resin molded article, found to suppress the mold deposit, and also to suppress the formaldehyde emission (Examples 1 to 18).

Footnote of Tables

*1 Amount of comonomer: ratio of oxyethylene group per 100 mol of oxymethylene group

*2 Molar concentration of effective carbonyl group: molar concentration of maleic anhydride-derived carbonyl group capable of reacting with melamine per unit mass of composition: molar concentration of maleic anhydride-derived carbonyl group (number of maleic anhydride-derived carbonyl group per unit mass of composition), or molar concentration of melamine-derived amino group (number of melamine-derived amino group per unit mass of composition), whichever is smaller, or a common value if both molar concentrations agree.

*3 ratio (mass proportion) of amount of formaldehyde emission in each of Examples and Comparative Examples, relative to the amount of formaldehyde emission in Comparative Example 1 assumed to be 100

In contrast, the mold deposit was worsened in both cases where melamine was not blended (Comparative Example 1), and where the amount of blending was too small (Comparative Example 2), representing that the molar concentration of effective carbonyl group fell below the specified level. The formaldehyde emission was also found to be large.

Meanwhile, the cases where the molar concentration of effective carbonyl group exceeded the specified range (Comparative Example 3, Comparative Example 4) were found to considerably lower MFR. On the contrary, the case where the molar concentration of effective carbonyl group fell below the specified range (Comparative Example 7) was found to considerably degrade the adhesiveness to the polyacetal resin molded article.

On the other hand, in a case where the ratio of polyacetal resin in the resin composition was high enough to fall outside of the specified range (Comparative Example 5), the adhesiveness to the polyethylene resin molded article and to the polyacetal resin molded article was found to considerably degrade. Meanwhile, in a case where the ratio of polyacetal resin in the resin composition was low enough to fall outside of the specified range (Comparative Example 6), the adhesiveness to the polyacetal resin molded article was found to considerably degrade.

Manufacture of Composite Molded Article

A composite molded article was manufactured by insert two-color molding, with use of the pellet obtained in Example 1, a source pellet for forming the polyacetal resin molded article, and a source pellet for forming the polyethylene resin molded article. In the obtained composite molded article, the individual layers were found to be adhered and integrated.

The source pellet for forming the polyacetal resin molded article pellet employed here was Iupital F20-01 from Mitsubishi Engineering Plastics Corporation. The source pellet for forming the polyethylene resin molded article employed here was Novatec HJ221 from Japan Polyethylene Corporation. The polyethylene resin used in the source pellets for forming the polyethylene resin molded article was not acid-modified.

REFERENCE SIGNS LIST 10 polyacetal resin molded article
20 intermediate layer
30 polyethylene resin molded article
100 composite molded article

The invention claimed is:

1. A resin composition comprising a resin ingredient and melamine,
the resin ingredient containing a polyacetal resin and a maleic anhydride-modified polyethylene resin,
the polyacetal resin and the maleic anhydride-modified polyethylene resin following a mass proportion of 20 to 49:80 to 51, and
molar concentration of the maleic anhydride-derived carbonyl group capable of reacting with amino group of melamine contained in the resin composition being 5 to 25 µmol/g; and,
the molar concentration of the maleic anhydride-derived carbonyl group, capable of reacting with amino group of melamine contained in the resin composition, representing molar concentration (µmol/g) of maleic anhydride-derived carbonyl group or molar concentration (µmol/g) of melamine-derived amino group, whichever is smaller, or a common value if both molar concentrations agree.

2. The resin composition of claim 1, wherein a content of melamine accounts for 0.005 to 1% by mass in the composition.

3. The resin composition of claim 1, wherein a ratio of maleic anhydride modification of the maleic anhydride-modified polyethylene resin is 0.10 to 1.0% by mass.

4. The resin composition of claim 1, wherein the polyacetal resin has a melt flow rate, when measured at 190° C. under 2.16 kg load, of 60 g/10 min or smaller.

5. The resin composition of claim 1, wherein the maleic anhydride-modified polyethylene resin has a melt flow rate, when measured at 190° C. under 2.16 kg load, of 10 g/10 min or smaller.

6. The resin composition of claim 1, wherein the maleic anhydride-modified polyethylene resin has a density of 0.954 g/cm$^3$ or smaller.

7. The resin composition of claim 1, wherein the polyacetal resin and the maleic anhydride-modified polyethylene resin follow a mass proportion of 20 to 40:60 to 80.

8. A pellet formed of a resin composition described in claim 1.

9. A composite molded article comprising:
a polyacetal resin molded article that contains a polyacetal resin;
a polyethylene resin molded article that contains a polyethylene resin; and
an intermediate layer arranged between the polyacetal resin molded article and the polyethylene resin molded article, so as to be brought into contact with the polyacetal resin molded article and the polyethylene resin molded article,
and,
the intermediate layer being formed of a resin composition described in claim 1.

10. A method for manufacturing a composite molded article described in claim 9, the method comprising:
stacking the polyacetal resin molded article, the polyethylene resin molded article and the intermediate layer, while placing the intermediate layer between the polyacetal resin molded article and the polyethylene resin molded article.

11. A method for manufacturing a composite molded article, the method comprising:
forming a polyacetal resin molded article, on one face of an intermediate layer that is formed of a resin composition described in claim 1; and forming a polyethylene resin molded article, on the other face of the intermediate layer.

12. The method for manufacturing a composite molded article of claim 11,
wherein the step of forming the polyacetal resin molded article includes molding a molten composition that contains a polyacetal resin, in contact with the intermediate layer, and
the step of forming the polyethylene resin molded article include molding a molten composition that contains a polyethylene resin, in contact with the intermediate layer.

13. The method for manufacturing the composite molded article of claim 10,
wherein the polyacetal resin molded article, the intermediate layer and the polyethylene resin molded article are integrally formed by three-color molding or insert molding.

14. A tank comprising a composite molded article described in claim 9.

15. The tank of claim 14, used for storing at least either one of fuel or alcohols.

16. The tank of claim 15, used for storing the fuel that contains gasoline, light oil or biodiesel.

17. The resin composition of claim 2,
wherein a ratio of maleic anhydride modification of the maleic anhydride-modified polyethylene resin is 0.10 to 1.0% by mass;
the polyacetal resin has a melt flow rate, when measured at 190° C. under 2.16 kg load, of 60 g/10 min or smaller; and
the maleic anhydride-modified polyethylene resin has a melt flow rate, when measured at 190° C. under 2.16 kg load, of 10 g/10 min or smaller.

18. The resin composition of claim 17, wherein the maleic anhydride-modified polyethylene resin has a density of 0.954 g/cm$^3$ or smaller.

19. The resin composition of claim 17, wherein the polyacetal resin and the maleic anhydride-modified polyethylene resin follow a mass proportion of 20 to 40:60 to 80.

20. The resin composition of claim 18, wherein the polyacetal resin and the maleic anhydride-modified polyethylene resin follow a mass proportion of 20 to 40:60 to 80.

* * * * *